United States Patent [19]
Coombs et al.

[11] Patent Number: 5,565,998
[45] Date of Patent: Oct. 15, 1996

[54] IDENTIFYING FILM FRAMES IN A VIDEO SEQUENCE

[75] Inventors: Glenn R. Coombs, Redhill, Great Britain; Derek Andrew, Charlwood, United Kingdom; Octavius J. Morris, Redhill, England

[73] Assignee: U.S. Philips Corporation, New York, N.Y.

[21] Appl. No.: 200,135

[22] Filed: Feb. 22, 1994

[30] Foreign Application Priority Data

Feb. 19, 1993 [GB] United Kingdom .................. 9303369

[51] Int. Cl.⁶ ............................. H04N 5/76; H04N 5/253; H04N 9/47
[52] U.S. Cl. .................................. 386/46; 348/96
[58] Field of Search ....................... 359/335, 310, 359/311; 360/33.1, 3, 14.1; 348/96, 97, 107; H04N 5/76, 5/253, 9/47, 3/36, 9/11

[56] References Cited

U.S. PATENT DOCUMENTS

| | | | |
|---|---|---|---|
| 4,786,979 | 11/1988 | Claus et al. ............................ | 358/335 |
| 4,901,161 | 2/1990 | Giovanella ............................. | 358/346 |
| 4,998,287 | 3/1991 | Katznelson et al. .................... | 348/97 |
| 5,365,280 | 11/1994 | De Haan et al. ........................ | 348/97 |
| 5,412,737 | 5/1995 | Govrin .................................. | 348/96 |

FOREIGN PATENT DOCUMENTS 9209172  5/1992  WIPO ............................. H04N 7/08

Primary Examiner—Thai O. Tran
Attorney, Agent, or Firm—Edward W. Goodman

[57] ABSTRACT

An apparatus for identifying automatically from an interlaced video recording the frames of an original cine-film sequence from which the video recording has been derived. The apparatus includes an evaluation for evaluating, for each successive pair of fields, a function measuring correlation between adjacent odd and even picture lines taken from the first and second fields of the pair, respectively; a comparator for comparing the correlation function of each field pair with that of at least one neighboring pair in the sequence; and a selector for identifying pairs with greater correlation than their neighbors as being derived from the same original film frame. The original frames are reconstructed and fed to an MPEG motion picture encoder to obtain high quality compressed video, Also provided is automatic scene cut detection which allows adaptive operation of the MPEG encoder.

12 Claims, 4 Drawing Sheets

IDENTIFYING FILM FRAMES IN A VIDEO SEQUENCE

BACKGROUND OF THE INVENTION

1. Field of the Invention

The invention relates to an apparatus for identifying, in an interlaced video recording, the frames of an original cine-film sequence from which the video recording has been derived.

The invention also relates to a video rate convertor including such an apparatus, and to a motion picture encoder.

When a cine film has been transferred to a video recording (by a so-called telecine operation), the differences between film and video standards generally do not permit a simple 1:1 correspondence between video frames and film frames. This is particularly true in view of the interlaced character of most video formats, whereby the odd-numbered picture lines and the even-numbered picture lines of each frame are transmitted in two separate fields. Even where a regular pattern of correspondence exists, in theory, it 15 can be unknown, or it can become disrupted by subsequent editing operations performed in the video domain.

2. Description of the Related Art

The inventors have recognized that for many applications, it would be advantageous to have an apparatus which could identify and perhaps reconstruct the original film frames from the fields of the video recording.

A very important application of such a technique might be in data compression video encoding systems, such as the MPEG system standardized by ISO. Such systems exploit the high degree of coherence both within and between successive frames of a motion picture sequence To eliminate redundant information while maintaining a good subjective picture quality. If the sequence being encoded is a video recording made by telecine, the frames encoded might be a mixture of fields taken from different film frames, which lack the coherence that was present in the original frame. The output quality of the encoder is thus seriously reduced.

Another possible application of the proposed apparatus may be suggested by WO 92/09172, which describes a display system including interpolation of additional lines between the lines of interlaced video fields. The system described therein operates in different modes depending on whether the original picture source is a video source or a telecine source. Unfortunately, the only solution proposed in WO 92/09172 relies on flag signals being generated by the telecine machine and included in the video signal to indicate whether the source is a video camera or telecine. Of course a vast number of films have already been transferred to video without these special flag signals, and it will not be practical to return to the original film source in most cases.

SUMMARY OF THE INVENTION

The invention provides an apparatus for identifying, in an interlaced video recording, the frames of an original cine-film sequence from which the video recording has been derived, the apparatus comprising:

means for receiving a sequence of video fields comprising the video recording;

means for evaluating, for each successive pair of fields, a function measuring correlation between adjacent odd and even picture lines taken from the first and second fields of the pair respectively;

means for comparing the correlation function of each field pair with that of at least one neighboring pair in the sequence; and means for identifying pairs with greater correlation than their neighbors as being derived from the same original film frame.

The ability to identify automatically which fields come from the same film frame can be of great assistance, particularly as a preliminary step in the compression of motion picture sequences for digital transmission or storage.

In one embodiment, the correlation function is evaluated twice for each pair of fields, reversing the roles of the first and second fields. This is useful when a pattern such as '3:2 pull-down' has been implemented by the telecine machine, and/or when the recording is subject to errors in so-called field dominance.

The apparatus may operate such that to identify each original film frame, a kernel of three successive fields is selected and the correlation function evaluated and compared for the first pair and the second pair of fields in the kernel, whereupon the pair with greater correlation is identified as a 'best' candidate pair for identification as a film frame and the kernel is advanced in the received sequence of video frames for the identification of the next film frame.

The kernel may be advanced in accordance with a preferred step size of at least two fields, which preferred step size is adapted to a pull-down pattern specified for the video recording.

Such an apparatus may further comprise means for detecting disruption of The specified pull-down pattern, and for causing the kernel to be advanced in accordance with a step size different to the preferred step size until the specified pull-down pattern is restored.

The preferred step size may define also a 'preferred' candidate field pair, while the means for detecting disruption of the pull-down pattern operates by detecting when the 'best' candidate pair is different to the 'preferred' candidate pair.

For the common '3:2 pull-down' pattern, the preferred step size alternates between two fields and three fields after the identification of each successive film frame.

The apparatus may further comprise means for detecting a discrepancy between the number of received video fields and the number of identified film frames, and for correcting the discrepancy by discarding and inserting frame identifications as necessary. This maintains the correct total duration of the motion picture sequence, and can avoid a loss of synchronization for example, between the pictures and a soundtrack.

The apparatus may further comprise means for generating an output sequence of frames by interleaving lines from identified pairs of video fields to generate an output sequence of video frames corresponding to the identified film frames. This output sequence enables the apparatus to be used in a video rate convertor.

The invention further provides in particular a motion picture encoder including such an apparatus, and further including means for encoding the generated sequence of output frames for transmission or storage. In an MPEG-compatible, or similar embodiment, the motion picture encoder implements inter-frame predictive coding. The apparatus may further include means for detecting scene cuts by detecting candidate field pairs with less correlation than their neighboring pairs.

The invention provides, in a second aspect a motion picture encoder which implements inter-frame predictive coding, characterized in that the encoder includes means for detecting scene cuts automatically by comparison of neighboring fields or frames, and is constructed to inhibit or modify the inter-frame predictive coding in response to detected scene cuts.

BRIEF DESCRIPTION OF THE DRAWINGS

Embodiments of the invention will now be described, by way of example, by reference to the accompanying drawings, in which.

DESCRIPTION OF THE PREFERRED EMBODIMENT

Figure 1:
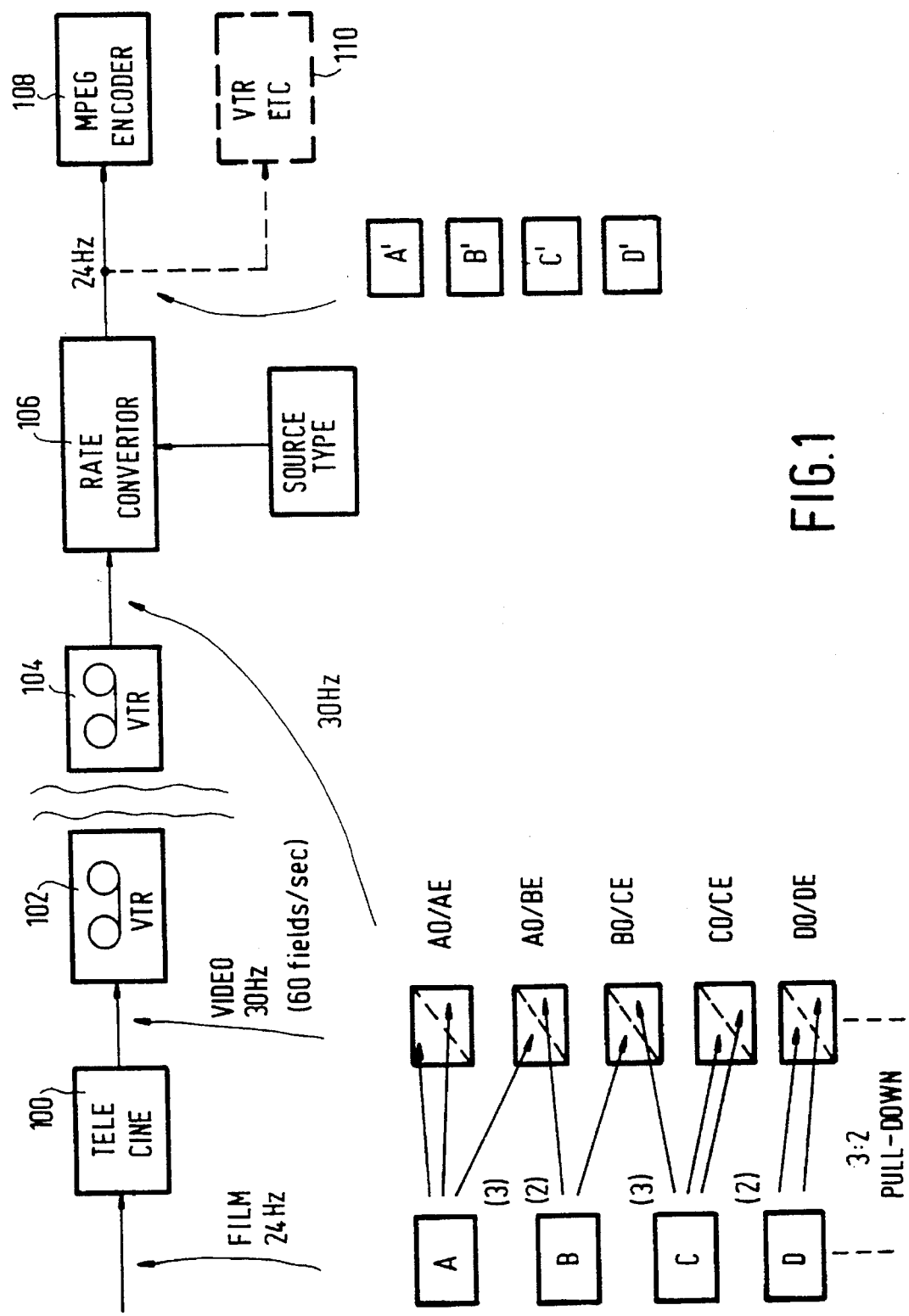
FIG. 1 illustrates telecine operation in a 3:2 pull-down mode, and further illustrates the application of frame detector apparatus embodying the present apparatus.

FIG. 1 illustrates at its left hand side the process of transferring film to videotape. A telecine machine 100 is used to scan the frames of a cine film in sequence, to generate video signals which are recorded on a videotape recorder (VTR) 102. Video signals conventionally define successive image frames in two interlaced fields, a first field containing the odd numbered lines of the image, and a second field containing the even numbered lines. Due to the different conventions in film and video technologies across the world, the telecine machine functions to adapt the frame rates as follows.

In transferring a 24 Hz film to European standard video (25 frames/second, 50 fields/second), it is conventional for the telecine apparatus merely to scan each film frame into two successive video fields. The viewer then tolerates the 4% speed-up that results when the video is replayed at 25 frames/second. If the so-called 'field dominance' is set correctly, the two fields in each video frame (odd field plus following even field) will always come from the same film frame.

In transferring to USA standard video (30 frames/second, 60 fields/second), the same process would give a very noticeable speed-up. Therefore it has become accepted practice that the telecine machine 100 samples the film frames by '3:2 pull-down' sequence, as illustrated in the lower left part of FIG. 1.

In 3:2 pull-down, the original film frames A, B, C, D etc. arrive with a 24 Hz frequency. The resulting video frames, with 60 Hz frequency, are made up of odd ('O') fields and even ('E') fields in the following 3:2 sequence:

AO AE AO BE BO CE CO CE DO DE EO EE EO FE FO GE GO GE HO HE . . .

In other words, film frame A generates three video fields, the next film frame B generates two video fields, C generates three fields, D two, E three and so on. The pattern repeats every five video frames, ten video fields or four film frames.

At the right hand side of FIG. 1, we see the reverse process in operation, where the video recording made at 102 is replayed on another VTR machine 104 and passed through a rate convertor 106 to generate video frames or fields at a different rate. A particular purpose of this is To obtain digitized frames at 24 Hz for supply to an MPEG or similar encoder 108, which employs data compression to store full-motion video pictures on optical disc CD-ROM. Alternatively, it may simply be desired to record a new videotape 110 at a different frame rate.

For these purposes it is most desirable for the rate convertor 106 to reconstruct from the recorded video frames a sequence of frames A', B', C' etc which correspond closely to the actual film frames A, B, C. Frame BO/CE, for example, may contain disturbing motion artifacts, because the odd lines and even lines come from two different film frames. As well as being visually obtrusive, in the MPEG encoder these artifacts 'steal' bandwidth from the true picture information, which is therefore encoded with a lower quality than necessary.

Unfortunately, it is not a simple matter to reconstruct the original film frames. Typically, the video recording made at 102 has been subjected to further processing and editing in the video domain since it was generated by the telecine machine, so that the 3:2 pull-down sequence can become disrupted. Also, variations on the strict 3:2 pull-down pattern may have been employed, as described for example in U.S. Pat. No. 4,786,979 (Claus et al). Similar problems can arise even in 25 Hz video recordings made by the simple 2:1 relationship: the field dominance is not always set correctly at the telecine, or can change during the sequence due to errors in duplicating or editing the tapes. In practice, it has been found that 1% of 25 Hz video recordings originated on film have somehow acquired incorrect field dominance.

Figure 2:
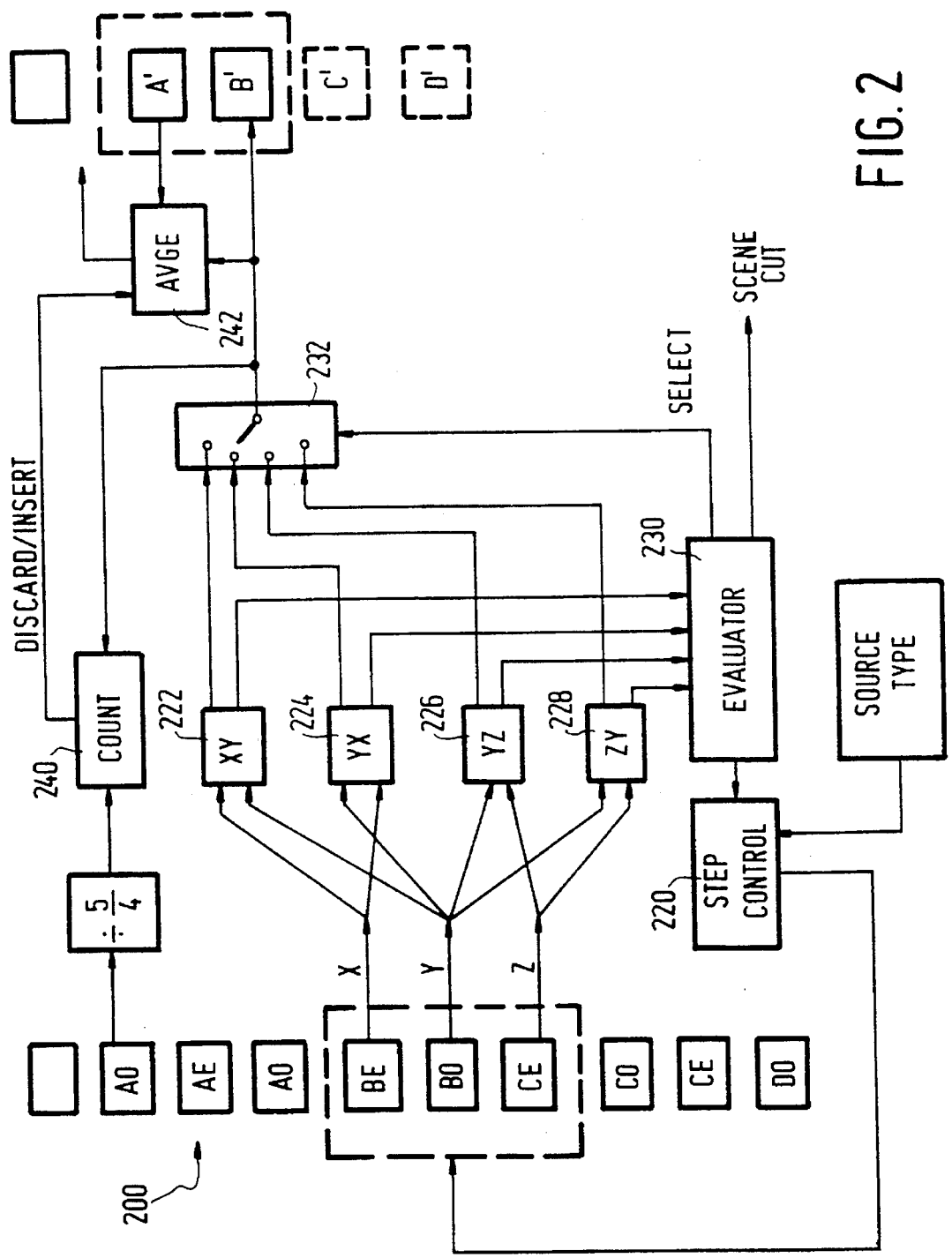
FIG. 2 shows, in block schematic form, the structure and operation of an apparatus embodying the invention.

FIG. 2 shows, in block schematic form, a rate convertor for correctly reconstructing original film frames A', B', C' and so forth from a video sequence. In the following description the component processing stages of the rate converter are described in terms of functional blocks whose operation will be readily understood by those of ordinary skill in the art. The physical structure of signal processing circuits to handle each function will be similarly known to the skilled person, is not essential for an understanding of the present invention, and will not be further described. It will also be apparent to the skilled person how the various functions may be implemented wholly or partly in software in the alternative to the following hardware-based arrangement.

A representative sequence of video fields AO, AE etc. is represented at 200 in multiple tap delay line 201. This sequence arrives continuously from the VTR machine 104. Under the control of a step controller 220, a moving kernel of three fields X, Y, Z is selected for processing. Although the apparatus has no way of knowing it, at the stage illustrated, X, Y, and Z are the fields BE, BO and CE respectively, from the 3:2 pull-down of film sequence A, B, C etc. What the apparatus does know, is that at least two of the fields X, Y and Z are derived from the same film frame, but there are four possibilities for reconstructing the frame: there may be a frame made from the first two fields X and Y, and/or a frame made from Y and Z. In each of these two cases, the first field may contain the odd lines, or it may contain the even lines. The apparatus therefore constructs at combiners 222–228 two pairs of candidate frames, which can be referred to as XY,YX and YZ,ZY.

Each candidate is constructed simply by taking lines alternately from the relevant two video fields at the appropriate delay line tap. Candidate YX thus comprises the first line of field Y, the first line of X, the second line of Y, second line of X and so on. These candidate frames are examined by an evaluator 230, which selects a 'best' candidate and controls a selector 232 to cause inclusion of the best candidate frame in the output frame sequence A', B', C' etc. Of course, from our knowledge of the input sequence, we can see that candidate YX combines fields BO and BE correctly to generate the desired frame B'. The apparatus has no such knowledge, but operates to identify the correct candidate as follows.

Evaluator 230 takes each line of each candidate frame, and calculates the differences between the pixels of that line and the line below it. These differences are thresholded to discard most of the genuine differences and also random noise. All differences above the threshold are counted up to obtain for each candidate a measure C(XY) etc. of correlation between pixels in adjacent rows over the entire frame. A candidate for which the two fields do not come from the same film frame (such as ZY in the illustrated situation) will tend to have a larger count C(ZY). Also, a candidate where the fields are interlaced incorrectly will have a larger count because the original line 4 is now below line 1, line 6 is now below line 3 and so on. The candidate with the lowest count is then the 'best' of the four candidates.

Clearly, when all three fields in the kernel come from the same frame (AO-AE-AO or CE-CO-CE), there will be two good candidates. The step controller 220 uses knowledge of the video source type (for example '3:2 pull-down from telecine') to implement a 'flywheel' characteristic to arbitrate between these candidates, and also ensures that the kernel follows accurately the 3:2 sequence. The flywheel is also important where there is little motion in the picture sequence, so that even the 'wrong' candidates have a very low count of differences. At the same time, the flywheel effect can be overcome automatically when the input sequence includes disruptions of the 3:2 sequence.

Figure 3:
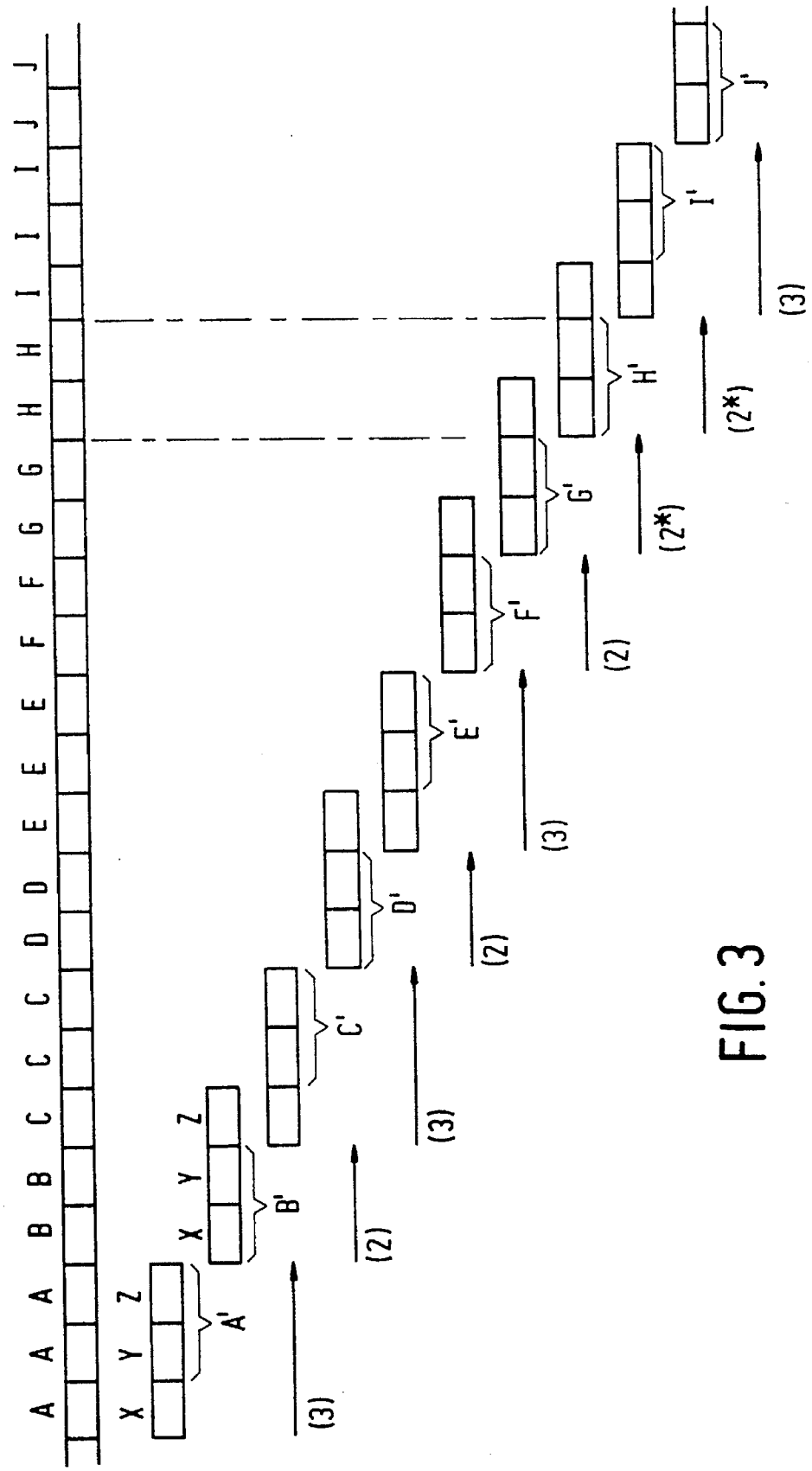
FIG. 3 illustrates the sequence of operation of the apparatus, in response to a sequence of video fields having in general a 3:2 pull-down pattern.

FIG. 3 illustrates the operation of the step controller for an input sequence of fields having a 3:2 pattern. Note that the pattern is disrupted in that there should be three fields 'G' between field pairs 'F' and 'H'. The step movement of the kernel X-Y-Z is shown below the input sequence, and for each kernel position it is indicated which pair of fields (X and Y or Y and Z) is chosen by the evaluator 230 to form which output field (A', B' etc.). Odd and even fields are not distinguished in FIG. 3, for clarity.

For some output frames (A', C', E', I' etc.), it is found that the second pair in the kernel (Y and Z) give the best candidate frame, in other words that the lowest count of pixel differences belongs to candidate YZ or ZY. In these cases, the step size to the next kernel position is made three. For other output frames (B', D', F', G', H' etc.) the first pair is chosen (candidate XY or YX) and the step size is made two. Of course, when the step size is only two, the counts established for candidates YZ and ZY can be re-used as these candidates are the same as candidates XY and YX after the step. This affords a substantial time saving, particularly in a software embodiment.

In view of the expected 3:2 pattern, the evaluator favours certain candidates over others to maintain a similar pattern in the step sizes 3-2-3-2-3-2 etc, For example; after finding the 3:2 sequence A-A-A-B-B, the evaluator examines a kernel X-Y-Z in which all three fields come from frame C. Clearly there will be two good candidate frames for C', for example YX and YZ. Because of noise, of course the count of differences might favour candidate XY slightly, but nevertheless a step size of 3 is preferred, and candidate YZ is chosen to continue the 3:2 pattern recently established. Only when this would result in the selection of an exceptionally bad candidate (exceptionally high count of pixel differences) does the evaluator cause a deviation from this pattern, as is seen for example at frames G' and H' in FIG. 3. The step size here is marked (2*) to indicate a deviation from the preferred 3:2 pattern.

One method for selecting the appropriate candidate to use, while implementing the flywheel effect appropriate to 3:2 pull-down, is illustrated by the following 'pseudo-code' listing:

```
Set variable LAST_STEP = -1;
START:
    Read in 3 fields X, Y, and Z;
    Calculate pixel difference counts C(XY),C(YX),C(YZ),
    C(ZY);
    Set SM1 = smaller of C(XY) and C(YX);
    Set SM2 = smaller of C(YZ) and C(ZY);

If smallest of the four counts is C(XY) or C(YX) then
        Set variable THIS_STEP = 2;
    else
        Set variable THIS_STEP = 3;
    endif;
    If THIS_STEP equals LAST_STEP (3:2 sequence broken)
    then
        If THIS_STEP equals 2 then
            set TDIFF = SM1/5;
        else
            set TDIFF = SM2/5;
        endif;
        If TDIFF is less than 150 then set TDIFF = 150;
        If |SM1-SM2| is less than TDIFF then
            Change THIS_STEP to preserve 3:2 sequence;
        endif;
    endif;

Choose output frame according to value of THIS_STEP;
    Set LAST_STEP = THIS_STEP; and
    Loop back to START until required number of frames have
    been identified.
```

The meaning of the above listing will be largely self-explanatory to those skilled in the art, but the following specific points deserve mention. The condition THIS_STEP equals LAST_STEP identifies cases where simply choosing the candidate frame with the smallest count of differences C(..) would cause a violation of the expected 3:2 sequence. If this condition is met, a further investigation is made to determine whether the pattern should be broken, depending on the magnitude of the difference ({SM1–SM2{) between the count for the 'best' candidate and that for the 'preferred' candidate. Only if the magnitude of this difference is above a certain threshold value TDIFF is the pattern to be broken. Otherwise, the step size THIS_STEP is changed to preserve the 3:2 pattern.

It will be seen from the listing that the threshold value TDIFF is determined adaptively, being set to one fifth of the lower of the two counts SM1 and SM2. The threshold, is in other words, set so that the 'best' candidate will be selected if its count is twenty percent lower than that of the preferred candidate. This is necessary because the counts will vary greatly depending on the scene content. A minimum for TDIFF is set at of 150, to avoid spurious results when the scene is almost constant and the counts are all very small.

Note that when the pull-down pattern is dislocated, as at G-G-H-H in the sequence illustrated, the total duration of the sequence of output frames A'-B'-C' etc. no longer matches that of the input sequence. This is undesirable, for example because soundtrack synchronization will be lost. The apparatus of FIG. 2 therefore includes an up/down counter 240 which compares the number of output frames generated with ⅘ times the number of input video fields received. If a difference accumulates to the extent that the output sequence is a whole frame out of step, the counter generates a discard or insert signal, causing a frame to be discarded from the output sequence, or causing an extra output frame to be inserted, respectively.

There are many possible ways of implementing the discarding and inserting of frames. Discarding of course can be a simple matter (miss out frame B', for example), and similarly, inserting a frame can be done simply by repeating one of the output frames (A'-B'-B'-C'-.). Note that if a scene cut is known to be present nearby (see below), a frame discarded or inserted immediately before the scene cut will tend to be quite undetectable by the viewer.

In the event that no scene cut is available to disguise the insertion/discarding, simply discarding a whole frame, or repeating a frame can produce noticeable jerks in the motion represented. To smooth these the FIG. 2 apparatus includes an averager 242 which can be used to generate a frame in which the pixel values are the average of those in two adjacent frames of the output sequence (A' and B' in the situation illustrated). In the event that a discard signal is generated by the counter, the apparatus will discard two frames and substitute the averaged frame. In the event of an insert signal, the apparatus will simply add the averaged frame between the two frames.

Figure 4:
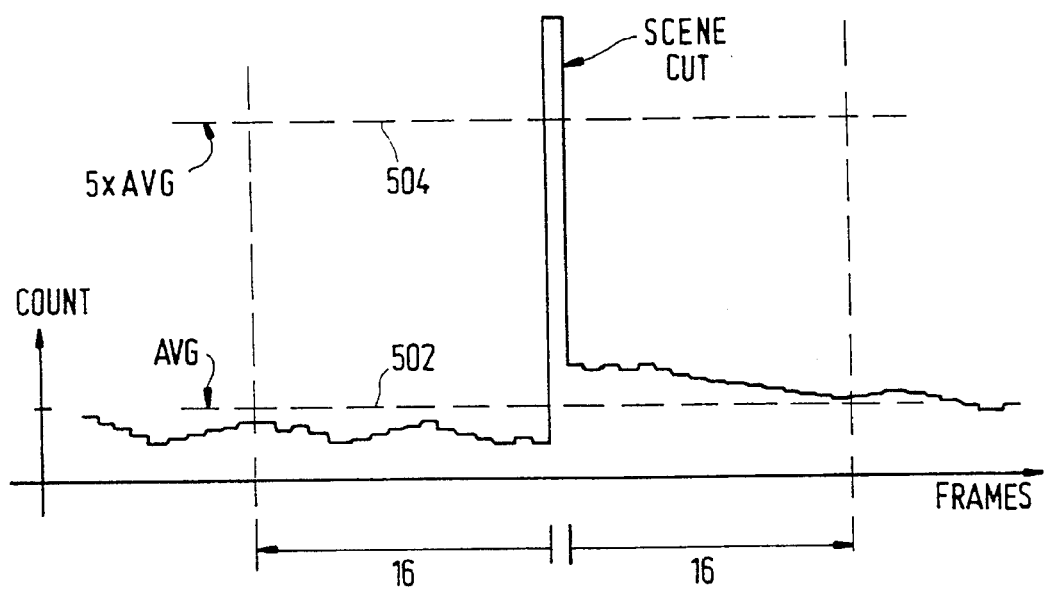
FIG. 4 illustrates the automatic detection of scene cuts in the apparatus of FIG. 2.

FIG. 4 shows how the evaluator 230 also provides automatic detection of scene cuts (sudden changes in the picture content, not slow 'cross-fades' or 'wipes') in the sequence of output video frames A'-B'-C' etc. The MPEG encoder 108 (FIG. 1) can improve data compression and image quality by choosing to encode the frame after a scene cut entirely by 'intra' coding, that is without prediction based on motion estimation with respect to the previous frame. Conventional MPEG coders require the engineer controlling the transfer from video to identify visually any scene cuts he/she wants treated in this way. The benefit of automatic detection will be readily apparent when one counts the number of scene cuts included in a typical feature film, In FIG. 4 the vertical axis represents the count of pixel differences for the detected frames, while the field number increases from left to right. The detection is based on the principle that two fields derived from firm frames either side of a scene cut will normally have very little correlation between their pixel values, so that an extremely high count of pixel differences can be taken as an indication of a scene cut. Even where there is no scene cut, however, the count tends to vary widely in practice, depending on the amount of fast motion in the scene, so that a simple threshold detector will not be a reliable indicator of scene cuts.

To detect scene cuts, evaluator 230 stores the count of differences for the most recent 31 candidate pairs of fields and maintains a running average (line 502- AVG). The evaluator therefore compares the count for each field pair with a threshold (line 504) which is related to the current average of the counts for the surrounding 31 pairs. It has been found by experiment that a threshold of five times the current average count provides a reliable detection mechanism. Of course other thresholds may be found suitable for different types of video material, and different methods of detection can be envisaged. For a real-time encoder, it may be inconvenient to wait for sixteen more field pairs before deciding if the current pair marks a scene cut. In such a case, it may be preferable to determine the threshold only by reference to past field pairs.

A great quality improvement can be gained by implementing the described techniques, with appropriate regard to the source of the video fields. For example, a different flywheel effect will be necessary for example where simple 2:1 pull-down has been used to transfer film to video at 50 fields/second. The preferred step size will be constant at two fields, but this pattern can be violated when the count of differences becomes too large due to editing, field dominance errors and so on.

As indicated in the introduction above, the apparatus described is particularly beneficial in that it simplifies the transfer of video recordings for MPEG coding, while also securing high quality for the MPEG coded output. Because the frames being encoded are the original film frames, their self-correlation properties are maximized, allowing the best combination of picture quality and data compression in the MPEG data stream. Apart from the quality of each frame, an overall improvement arises because the encoder doesn't receive more frames than are absolutely necessary to convey the information content.

It may be noted that the MPEG encoder generally encodes a picture with half as many lines as each of the output frames. It would therefore be possible, in principle, to encode just one field from each identified frame. It is preferable however to reconstruct the complete frame and then filter to a lower resolution for MPEG encoding. This improves the picture quality, so that the available bandwidth is used to encode real picture information and not aliasing noise. It is found, in practice, that even a small amount of noise in the images supplied to the MPEG encoder causes a disproportionate loss of quality in the encoded image, because the noise does not have a coherent character and 'steals' from the true picture content a disproportionate amount of bandwidth.

Of course the skilled reader will be able to envisage many other applications of the above techniques, and many other implementations of the above principles, all within the scope of the present invention.

We claim:

1. An apparatus for identifying, in an interlaced video recording, the frames of an original cine-film sequence from which the video recording has been derived, the apparatus comprising:

means for receiving a sequence of video fields comprising the video recording;

means for evaluating for each successive pair of fields a function measuring correlation between adjacent odd and even picture lines taken from the first and second fields of the pair respectively;

means for comparing the correlation function of each field pair with that of at least one neighboring pair in the sequence; and means for identifying pairs with greater correlation than their neighbours as being derived from the same original film frame.

2. An apparatus as claimed in claim 1, wherein the correlation function is evaluated twice for each pair of fields, reversing the roles of the first and second fields.

3. An apparatus as claimed in claim 1, wherein to identify each original film frame a kernel of three successive fields is selected and the correlation function evaluated and compared for the first pair and the second pair of fields in the kernel, whereupon the pair with greater correlation is identified as a 'best' candidate pair for identification as a film frame and the kernel is advanced in the received sequence of video frames for the identification of the next film frame.

4. An apparatus as claimed in claim 3, wherein the kernel is advanced in accordance with a preferred step size of at least two fields, which preferred step size is adapted to a pull-down pattern specified for the video recording.

5. An apparatus as claimed in claim 4, further comprising means for detecting disruption of the specified pull-down pattern, and for causing the kernel to be advanced in accordance with a step size different to the preferred step size until the specified pull-down pattern is restored.

6. An apparatus as claimed in claim 5, wherein the preferred step size defines also a 'preferred' candidate field pair, and wherein the means for detecting disruption of the pull-down pattern operates by detecting when the 'best' candidate pair is different to the 'preferred' candidate pair.

7. An apparatus as claimed in claim 4, wherein the preferred step size alternates between two fields and three fields after the identification of each successive film frame.

8. An apparatus as claimed in claim 1, yet further comprising means for detecting a discrepancy between the number of received video fields and the number of identified film frames, and for correcting the discrepancy by discarding and inserting frame identifications as necessary.

9. An apparatus as claimed in claim 1, further comprising means for generating an output sequence of frames by interleaving lines from identified pairs of video fields to generate an output sequence of video frames corresponding to the identified film frames.

10. A video rate convertor including an apparatus as claimed in claim 9.

11. A motion picture encoder including an apparatus as claimed in claim 9, and further including and means for encoding the generated sequence of output frames for transmission or storage.

12. A motion picture encoder as claimed in claim 11, wherein the encoder implements inter-frame predictive coding, and wherein the apparatus yet further includes means for detecting scene cuts by detecting candidate field pairs with less correlation than their neighboring pairs.

* * * * *